May 15, 1945.  C. BARDEN  2,375,887
REAR VIEW DEVICE
Filed Oct. 10, 1942  2 Sheets-Sheet 1
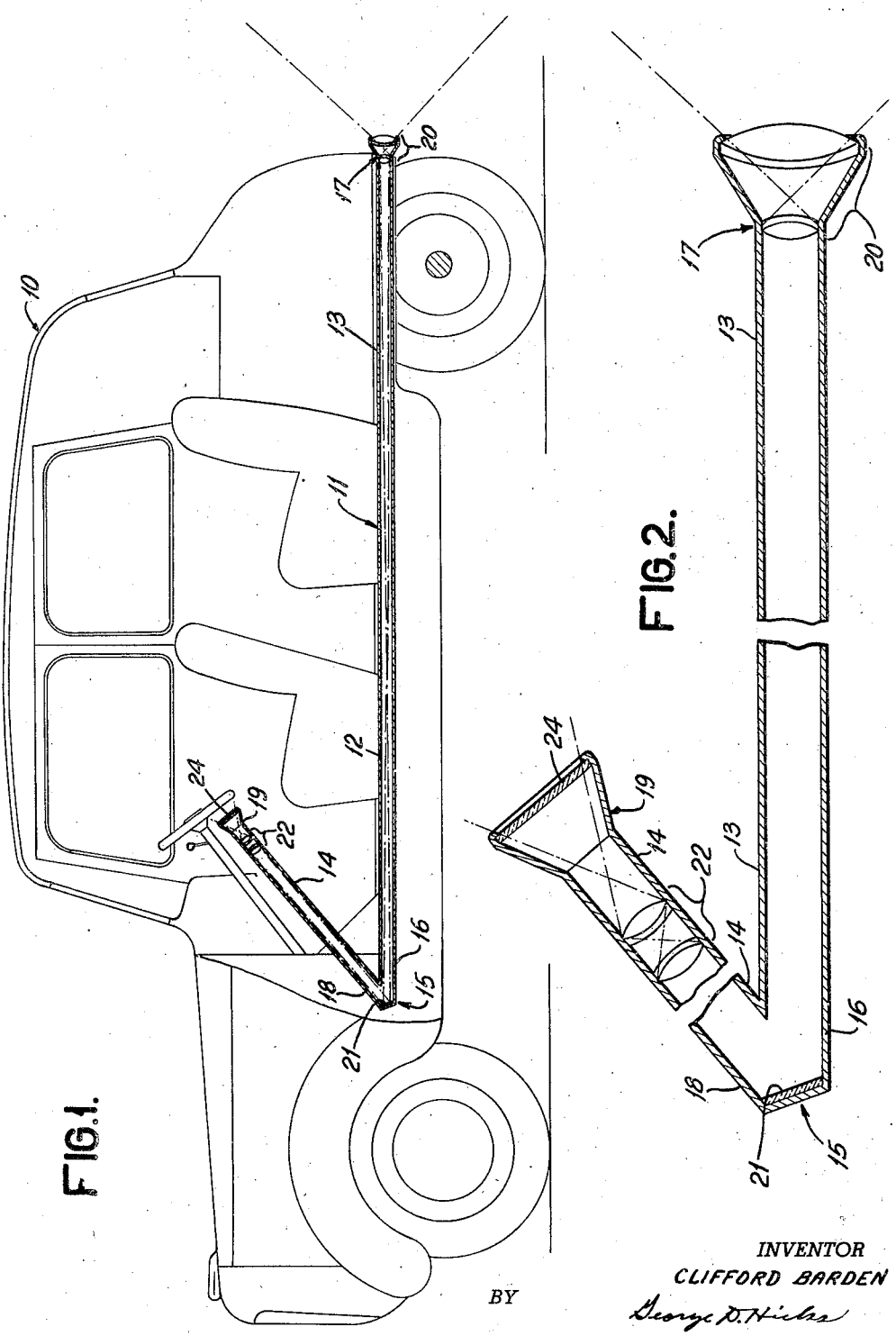
INVENTOR
CLIFFORD BARDEN
BY George D. Hicks
ATTORNEY May 15, 1945.　　　　C. BARDEN　　　　2,375,887
REAR VIEW DEVICE
Filed Oct. 10, 1942　　　　2 Sheets-Sheet 2

INVENTOR
CLIFFORD BARDEN
BY George D. Hicks
ATTORNEY

Patented May 15, 1945

2,375,887

UNITED STATES PATENT OFFICE 2,375,887

REARVIEW DEVICE

Clifford Barden, Lisle, N. Y.

Application October 10, 1942, Serial No. 461,563

1 Claim. (Cl. 88—70)

This invention relates to motor vehicles such for example, as automobiles, trucks, buses, airplanes, or the like, and more particularly the invention relates to rear-view devices for motor vehicles which function to provide the driver or operator with a view of the area to the rear of the vehicle without requiring him to change from the position he normally occupies while driving the car.

Prior art devices of the above character, usually comprise some form of rear-view mirror mounted at the front of the vehicle so that it faces the driver and so positioned as to present to the driver the view in rear of the vehicle. Rear-view mirrors are customarily supported within the car and above the center of the windshield so that they reflect the view as it appears through the rear window; or, they are mounted on the end of an arm extending outwardly from the side of the car next to the driver and they reflect the view as it appears to the side and rear of the car. Neither the mirror inside of the vehicle nor the one projecting from the side are satisfactory, because they cannot give the driver a view of the objects directly in rear of the vehicle. Such a view is highly desirable in backing up and in parking the vehicle, and it is also desirable to have such a view when moving forward because with the devices of the prior art, another vehicle can be following at the side and rear without being seen. Such a condition is likely to cause an accident should the driver in front move toward the side of the road occupied by the vehicle following. A further disadvantage of the inside rear-view mirror is that the view through the rear window is oftentimes obstructed by persons or objects within the rear part of the car.

It is an object of the present invention to provide a rear-view device for motor vehicles which is of improved construction and arrangement of parts and which effectively overcomes the above-outlined disadvantages.

A further object is to provide a new and improved rear-view device for motor vehicles which provides the driver at all times with a view of the area directly in rear of the car as well as the area provided by the prior art devices.

Other objects of the invention will be pointed out in the following decription and claim and illustrated in the accompanying drawings, which disclose, by way of example, the principle of the invention and the best mode, which has been contemplated, of applying that principle.

In the drawings:

Fig. 1 is a view showing one preferred form of rear-view device as embodied in an automobile, the rear-view device appearing in vertical longitudinal section, and the automobile being shown somewhat diagrammatically;

Fig. 2 is an enlarged fragmentary vertical section showing portions of the rear-view device of Fig. 1 apart from the automobile;

Figure 3:
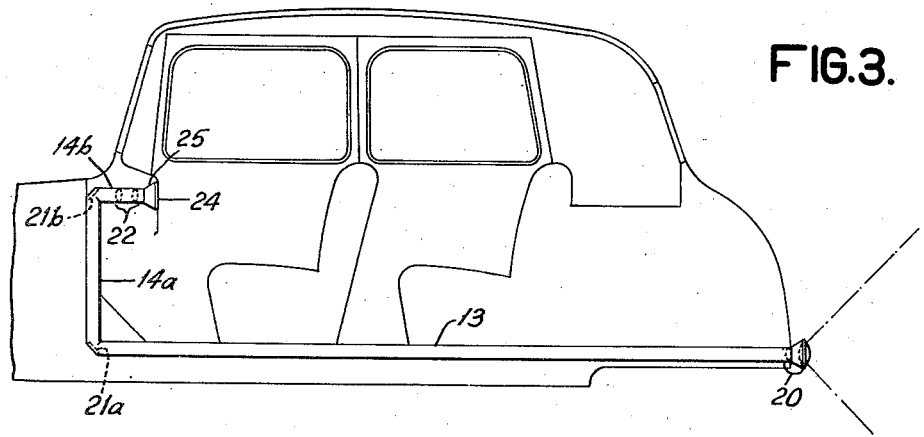
Fig. 3 is a view showing another form of rear-view device as embodied in an automobile, the device being shown in side elevation, and the automobile diagrammatically.

Referring first to the embodiment of my invention shown in Figs. 1 and 2, the reference numeral 10 indicates a conventional form of autobile, and the numeral 11 indicates a rear-view optical device embodied in the automobile 10. The device 11 functions to display continually to the driver, images of objects in rear of the automobile and including particularly those located directly behind the vehicle and those at the sides and rear of the vehicle.

The device 11 is shown as comprising a light-transmitting tube 12 formed of two straight tube sections 13 and 14, respectively, which are joined together at 15 in end-to-end relation and with their respective longitudinal axes intersecting at the point of their juncture. The tube section 13 is shown as being arranged below the level of the floor of the vehicle and as extending rearwardly from a front end 16, located forwardly of the driver's compartment, and to a rear end part 17 located outside of the confines of the vehicle and at the rear or behind the vehicle. The other tube section 14 is relatively short and is shown as comprising a lower end 18 joined at 15 to the front end 16 of the tube section 13 and extending upwardly and rearwardly therefrom and through the floor board of the driver's compartment and terminating in an upper end part 19 located in a position where it is within the direct vision of the driver.

The device 11 also comprises an object-viewing means here shown as being in the form of an objective lens system 20 which is located within the rear end part 17 of the tube section 13 and where objects behind the vehicle and those at both sides of the rear of the vehicle and those below the level of the rear window can be effectively viewed thereby. The objective lens system is preferably of a type which has a relatively wide angle of view; for example, one which is in excess of 100°. The light received by the lens system 20 is transmitted forwardly through the tube section 13 to the point of juncture 15 where a mirror 21 is positioned and functions to reflect such light upwardly and rearwardly through the tube section 14 to a second lens system 22 located adjacent the upper end part 10 of the section 14. The lens system 22 is so constructed and positioned with respect to the system 20 and the mirror 21, that images transmitted thereto through the tubes 12 from the objective lens system 20, will be projected in erect position and in focus on an image-displaying element here shown as being in the form of a ground glass screen 24 arranged across the upper end part 19 of the tube section 13 and within the direct vision of the driver of the vehicle. As will be appreciated, suitable means (not shown) may be provided for adjusting the position of the mirror and for focusing and adjusting the lens systems 20 and 22.

The modification shown in Fig. 3 is of the same general construction as the one shown in Figs. 1 and 2, with the exception that instead of providing one tube section like the one indicated at 14 in Fig. 1 and which extends upwardly and rearwardly from the forward end of tube section 13, I provide two tube sections 14a and 14b, respectively. The section 14a is connected at its lower end to the forward end of section 13 and extends vertically upward therefrom, and the section 14b is connected at its forward end to the upper end of section 14a and extends horizontally rearward therefrom and terminates in a rear end part 25 disposed within a suitable opening in the dash of the vehicle and within the direct vision of the driver. A mirror 21a reflects the light from section 13 upward through section 14a, and mirror 21b between section 14a and 14b. The objective lens system 20 is the same and functions in the same manner as in Figs. 1 and 2. The lens system 22 is also the same as in Figs. 1 and 2 and is located in section 14b. The ground glass screen 24 is also the same and is positioned across the rear end of section 14b.

Figure 4:
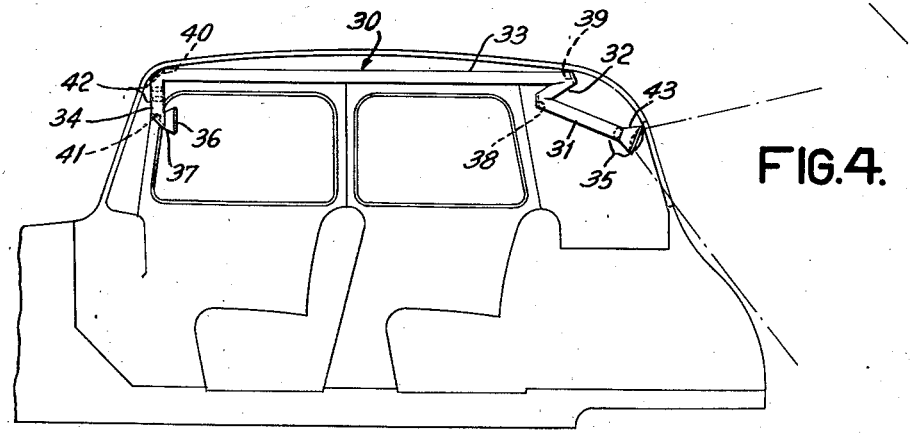
Fig. 4 is a view similar to Fig. 3 and showing a third form of rear-view device as embodied in an automobile.

In Fig. 4 of the drawings, I have shown a modified form of rear-view optical device which is located in the upper part of the passenger space of the vehicle and which comprises a light-transmitting tube 30 including straight tube sections 31, 32, 33, and 34 which are connected together in end-to-end relation so that images of objects in rear of the vehicle are transmitted serially therethrough from an objective lens system 35 in a rear end part 43 forming a rearward extension of section 31, and are projected in focus on a ground glass screen 36 arranged across a forward end portion 37 which is directed horizontally rearward from the lower end of section 34. Mirrors 38, 39, and 40 function, respectively, to reflect the light transmitted thereto from a rearward tube section, lengthwise of a tube section arranged forwardly thereof, and the mirror 41 reflects light from section 34 onto the ground glass screen 36. A second lens system 42 is located in the tube section 34 and functions in the same manner as the lens system 22 of Figs. 1, 2, and 3. The rearmost tube section 31 is directed downward and rearward and the objective lens system in the rear end portion 43 thereof views through the rear window of the vehicle objects directly in rear of the vehicle and below the level of the rear window as well as objects further to the rear and on both sides of the vehicle.

Figure 5:
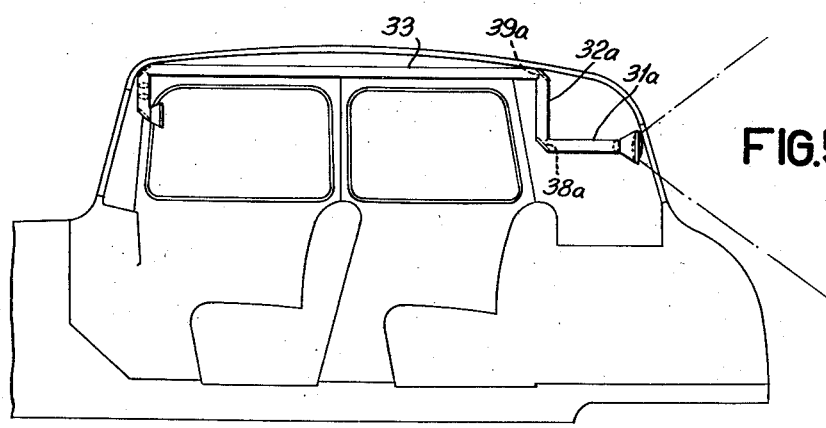
Fig. 5 is a view like Fig. 3 and showing a fourth form of rear-view device as embodied in an automobile.

The modification shown in Fig. 5 is the same and functions in the same manner as the one shown in Fig. 4, with the exception that the rearmost tube section 31a of Fig. 5, instead of being directed downward and rearward as in Fig. 4, extends horizontally rearward; and, with the additional exception, that section 32a is arranged vertical and connects the forward end of section 31a to the rear end of tube section 33. Mirror 38a reflects light from section 31a through section 32a and mirror 39a reflects such light from section 32a forwardly through section 33. Otherwise, the modification of Fig. 5 is identical with the structure of Fig. 4.

While there have been shown and described and pointed out the fundamental novel features of the invention as applied to several modifications, it will be understood that various omissions and substitutions and changes in the form and details of the device illustrated and in its operation may be made by those skilled in the art without departing from the spirit of the invention. It is the intention therefore to be limited only as indicated by the scope of the following claim.

What is claimed is:

The combination with a motor vehicle of a rear-view optical device therefor comprising a pair of straight light-transmitting tube sections joined together in end-to-end relation and at a point forward of the driver's seat of said vehicle; one of said tube sections extending rearwardly from the point of juncture and terminating in a rear end positioned to view objects in the rear of said vehicle; an objective lens system in said rear end having a relatively wide range of vision; the other of said tube sections extending upwardly and rearwardly from said point of juncture and terminating in a forward end positioned within the direct vision of the operator; a ground glass screen disposed approximately normal to the axis of said other tube section and across said forward end; a light-reflecting device at the juncture of said sections and positioned to reflect light which is transmitted forwardly through said one tube, upwardly and rearwardly through said other tube; and a second lens system in said other tube and so constructed and positioned with respect to said objective lens and to said screen that the images of objects in rear of said vehicle viewable by said objective lens are projected in focus on said screen.

CLIFFORD BARDEN.